April 26, 1955  R. B. WHITE, JR  2,706,855
CONTINUOUS FIX INDICATOR
Filed June 24, 1946  3 Sheets-Sheet 1
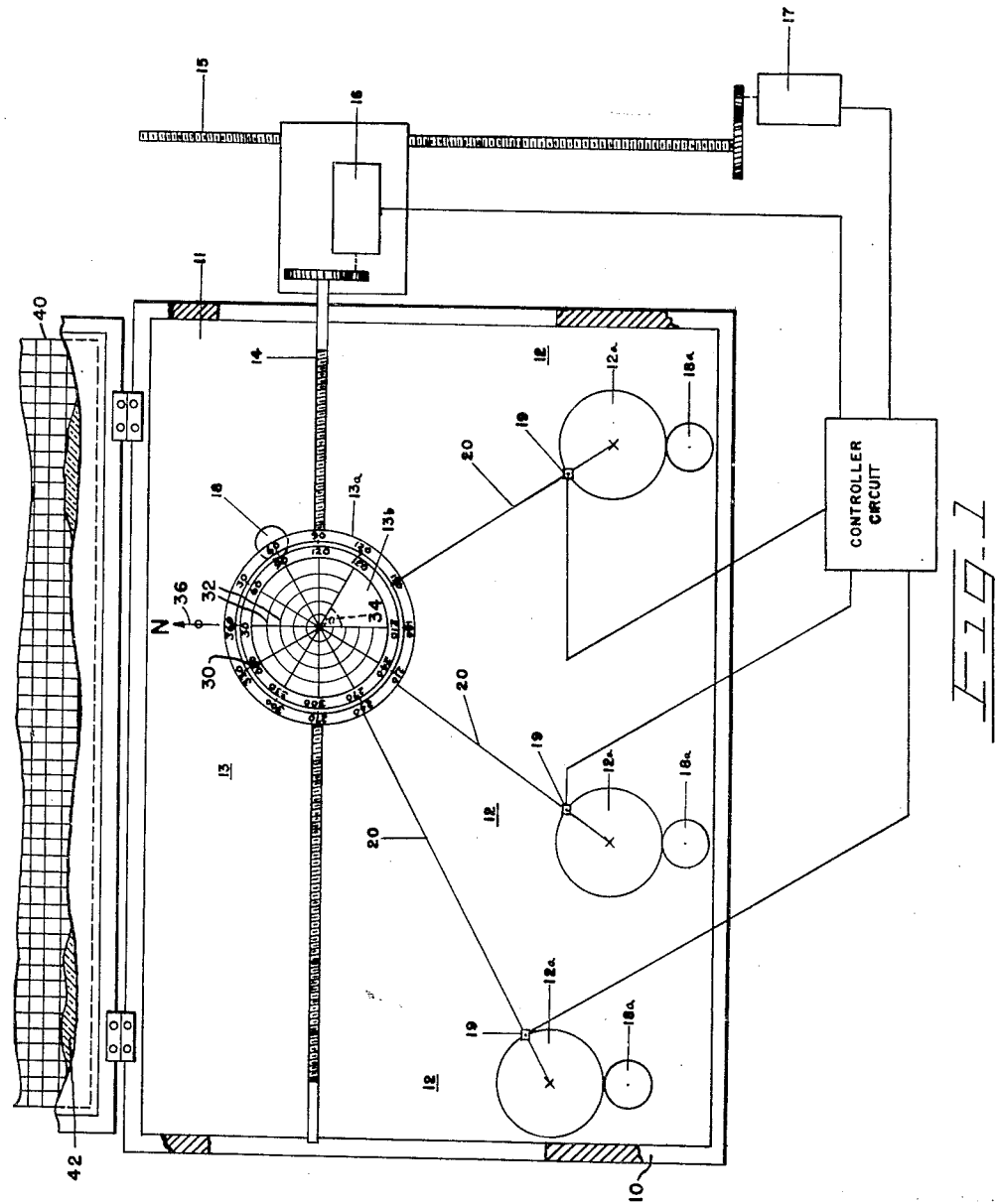
INVENTOR.
Roby B. White, Jr.
BY
ATTORNEY.

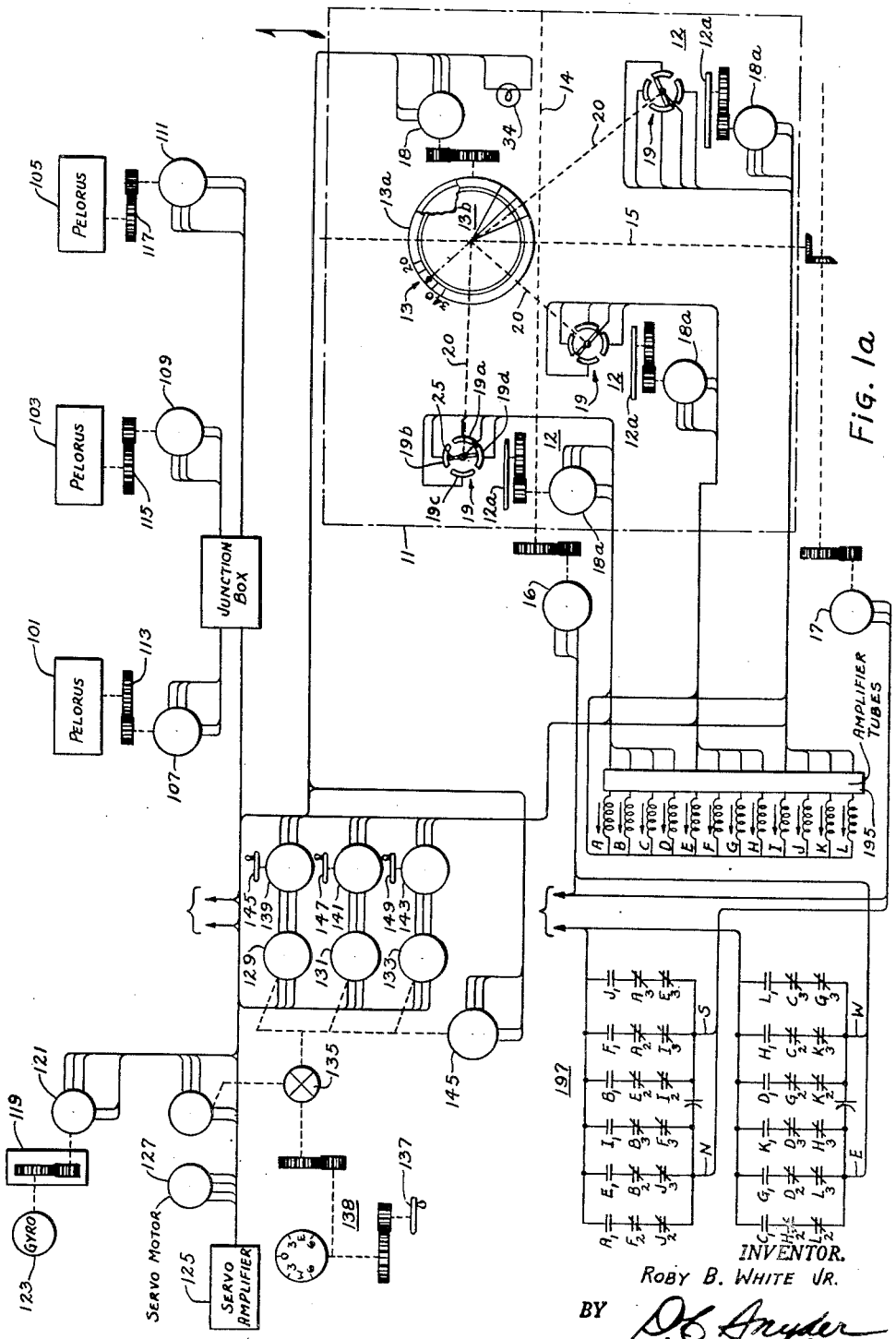

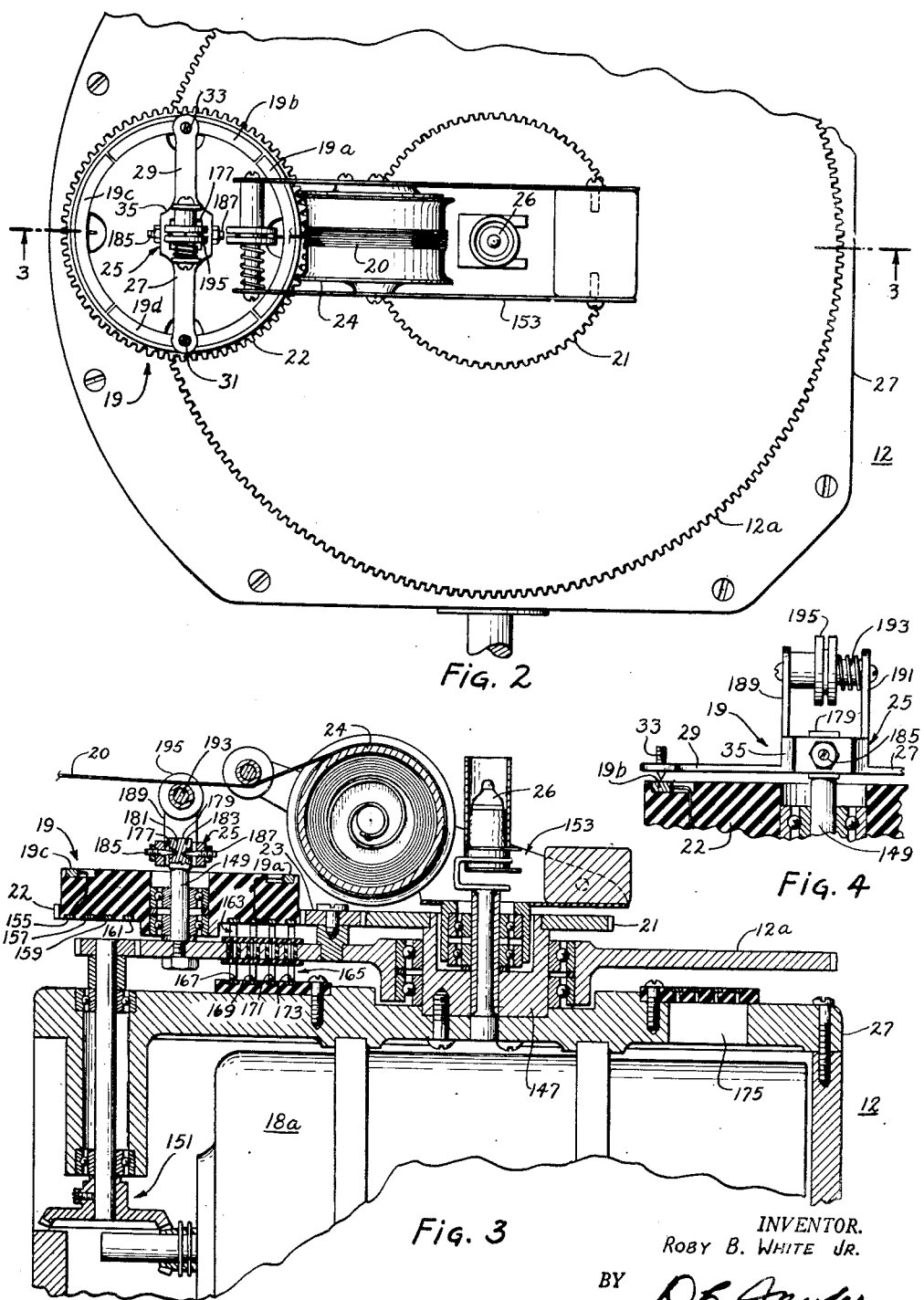

2,706,855
CONTINUOUS FIX INDICATOR

Roby B. White, Jr., United States Navy

Application June 24, 1946, Serial No. 678,755

11 Claims. (Cl. 33—1)

(Granted under Title 35, U. S. Code (1952), sec. 266)

This invention relates in general to an apparatus for continuously and automatically indicating the position of a movable body with relation to known fixed objects.

As used herein, the term "synchro" means a self-synchronous motor, generator, or system, also commonly known under other names such as "selsyn," "autosyn," and "synchrotie," and the term "synchro" will be used in the specification and claims to denote apparatus as thus defined.

An object of this invention is to provide an apparatus for continuously and automatically indicating the position of a movable body with respect to fixed objects of known position.

Another object is to provide an apparatus for continuously and automatically indicating the position and heading of a ship with respect to fixed objects of known position.

A further object is to provide an apparatus for rapidly and accurately plotting the locations, with respect to fixed objects of known position, of objects whose distances and relative bearings from a ship have been determined.

Further objects and advantages of this invention, as well as its arrangement, construction and operation, will be apparent from the following description and claims in connection with the accompanying drawings, in which Fig. 1 is a schematic plan view of the plotting table and associated apparatus according to one form of this invention, Fig. 1a is a block diagram, partly schematic, of the complete apparatus, Fig. 2 is a plan view of one of the bearing repeaters used in this invention, Fig. 3 is a view in cross section taken along the line 3—3 of Fig. 2, and Fig. 4 is an enlarged elevation view, partly in cross section, of a part of a contactor switch mechanism illustrated in Figs. 2 and 3.

In Fig. 1 there is shown apparatus for continuously and automatically indicating the position of a ship, the apparatus comprising a rectangular box 10 adapted to be mounted on the ship, and having a bottom wall serving as a table 11 or the like. A plurality of bearing repeaters 12 are disposed on the table 11 to represent, by their position, the location of fixed objects or land marks outside the ship, said repeater 12 being movably positioned on table 11. A ship's position indicator 13 is mounted for movement over table 11. The position of indicator 13 on the table 11 is controlled by an east-west positioning screw 14 and a north-south position screw 15, which screws 14 and 15 are operated by motors 16 and 17 respectively. Electrical contacts 19 on the bearing repeaters 12 operate to control motors 16 and 17, as will be hereinafter described, whereby the position of position indicator 13 is controlled across the entire area of table 11.

Operably connected to position indicator 13 is a synchro motor 18 which is operated by means of a gyrocompass 123 (Fig. 1a) or the like, to maintain the position indicator pointing to the true heading of the ship.

The position indicator 13 comprises a pair of relatively rotatable circular scales 13a and 13b, the scale 13a being of annular shape, and scale 13b being a disc concentrically mounted within the annulus of scale 13a. Each of the scales 13a and 13 b are preferably of Lucite or other transparent material on which 0 to 360-degree graduations may conveniently be engraved and filled with opaque ink or the like. As shown, the degree markings on each scale 13a and 13b advance in clockwise direction about the center of the indicator 13. Reading of scale 13a as by means of a reference arrow 30 formed at the 000 mark on scale 13b indicates the instant true ship's heading as controlled by the gyroscope (not shown) of the ship, while reading of scale 13b according to the position of the 360° mark on scale 13a indicates the relative bearing from the ship's heading.

Scale 13b is graduated further in a series of concentric arcs of circles 32 having progressively increasing radii of curvature. Circles 32 may be calibrated to indicate range of an object from the ship on which the indicator is mounted.

The indicator 13 is preferably housed in a case (not shown) with the annular scale 13a secured to the case and the disc scale 13b mounted for rotation within the case about the longitudinal axis thereof. A light 34 placed beneath ring 13a and card 13b projects their calibrations and the ship's position and heading onto a chart or map 40 placed on a transparent top 42 of box 10 above table 11.

In operating the indicator 13, the scale 13a is preliminarily adjusted so that the 180°–360° line thereof is alined with an arbitrary north or fiducial mark 36 that is formed on the table 11. Scale 13b is then rotated independently of synchro 18 until the arrow 30 is directed toward the scale 13a indication that represents the true instant heading of the ship. This independent rotation of scale 13b is accomplished by loosening an adjustment screw (not shown) by means of which the scale is normally secured to the shaft of the synchro 18. After the independent rotation of scale 13b, the adjustment screw is tightened so that the scale 13b is rotated by the synchro. Synchro 18 is electrically connected to a transmitting synchro, as will appear hereinbelow, which, in turn, is geared to the gyro of the ship. The same gear ratio exists between synchro 18 and scale 13b. Hence, the arrow 30 always indicates on scale 13a the true instant heading of the ship, as controlled by the gyroscope of the ship.

Having thus described the components of the apparatus illustrated in Fig. 1, attention is now directed to Fig. 1a for a detailed description of the complete system.

Fig. 1a discloses, in block diagramamtic form, the position indicating apparatus constructed according to the present invention. To provide navigational fixes of a craft bearing the apparatus, in accordance with the present invention, true reverse bearings of at least two landmarks are projected upon a chart upon which the spatial interrelationship of the landmarks is known. Actual pelorus bearings of the craft are obtained by simultaneously sighting on three preselected landmarks (not shown) by means of conventional peloruses 101, 103 and 105. While three peloruses are herein disclosed and described, it will be understood that this particular number is not essential. Any number of peloruses more than one may be used, the set of three here shown being exemplary only.

The operation of lining up the pelorus sights on the associated landmarks drives respective synchro generators 107, 109, 111 that are fixedly mounted on the craft. The rotors of the generators are connected to the respective pelorus sighting element through suitable high-ratio gear trains 113, 115, 117, respectively, so that the angular displacement of the synchro rotor is proportional to the relative bearing of the landmark and the craft.

As is well known in the art of navigation, reverse true bearings are obtainable from relative bearings by adding thereto the gyro heading of the craft (corrected for gyro error) and 180°. In the apparatus of the invention, the operation of converting relative bearing to reverse true bearing is accomplished by means of an assemblage of differential synchros and mechanical differentials.

Thus, as shown, a mechanical pick-up 119, having the same mechanical ratio to a synchro generator 121, as the peloruses 101, 103, 105 have to the respective synchro generators 107, 109, 111, is connected to the gyro 123 of the craft. Accordingly, swinging the craft through 360° has the same effect as rotating a pelorus 360°. Inasmuch as the pelorus is sighted on a remote landmark while the craft swings, the addition of gyro heading to the pelorus yields no change in true bearing.

The electrical output of the synchro generator 121 is repeated by a servo amplifier 125 and servomotor 127 of which the output is utilized mechanically to drive a set of three differential synchros 129, 131, 133, and a synchro generator 145 through a mechanical differential mechanism 135.

Gyro error correction is introduced, if required, through the differential mechanism 135 by means of a handcrank 137 and suitable speed-changing gearing 138.

The electrical outputs of the synchro generators 107, 109, 111 driven from the peloruses are fed through a junction box into the corresponding differential synchros 129, 131, 133 and, since gyro heading and error are also fed into these differential synchros, the outputs thereof are true bearing. Conversion to true reverse bearing is accomplished by rotating the stators of the differential to introduce the factor of 180°.

The outputs of the differential synchros 129, 131, 133 are desirably fed into a second set of differential synchros 139, 141, 143 having normally fixed stators and rotors, but which can be adjusted in relative orientation as by handcranks 145, 147, 149 to correct for mechanical misalignments at the time of first setting up the apparatus for operation.

In the foregoing description, the details of construction of the various synchro devices, the peloruses, the gyro, the servomotor and amplifier have been omitted since such devices are of conventional design and, accordingly, such details are well known to those skilled in the art. In the drawing, electrical connections are shown by solid lines using a conventional single line for a multiple conductor cable where obvious. Mechanical linkages and connections are designated by broken lines.

The plotting table 11 is shown, in Fig. 1a, by dot-dash lines, and corresponding parts disposed thereon are indicated by the same reference characters as employed in Fig. 1.

The bearing repeaters 12 are controlled by synchro motors 18a, each of which is, in turn, controlled by corresponding synchro generators 107, 109, 111 driven by peloruses 101, 103, 105 which, for example, can be manually controlled by a member of the ship's crew, and which is constantly aimed at the external landmark corresponding respectively with each bearing repeater 12. Accordingly, as the bearing of the landmark with respect to the ship is changed, the angular position of the bearing repeater on table 11 is changed. In order to insure that the angular position of bearing repeaters represents the true reverse bearing of the corresponding landmarks, the synchro motors 18a are set off from the corresponding relative bearing by an amount equal to the gyro heading of the ship, plus or minus the gyro error, plus 180°, as described above.

There is shown in Figs. 2, 3 and 4 the mechanism that maintains the multiple contact 19 at the same north-south orientation when bearing repeater 12 rotates. A gear 21 is fixed, as by spacer member 147, to the case 27 of bearing repeater 12 and is mounted coaxially with top plate 12a so as to be stationary with respect to case 27. Another gear 22, of the same diameter as gear 21, is mounted by means of a spindle 149 on top plate 12a, but free to turn. An idler gear 23, mounted on top plate 12a, is placed between gears 21 and 22 so that when top plate 12a is rotated by synchro motor 18a through a suitable transmission 151, the north-south orientation of gear 22 remains the same. A cable or wire 20 is wound on a spring drum 24 that is mounted in a suitable frame 153, which is, in turn, coaxially disposed with respect to top plate 12a but is free to turn relative thereto so that cable 20 is always on the straight line between the centers of bearing repeater 12 and position indicator 13 (Fig. 1).

The multiple-contact mechanism 19 and associated lever 25, illustrated diagrammatically in Figs. 1 and 1a, are shown in detail in Figs. 2, 3 and 4. As shown, the multiple contact 19 comprises a commutator ring having four arcuate conductive segments 19a, 19b, 19c, and 19d mutually insulated from each other and mounted at the periphery of gear 22. If desired, gear 22 can be fabricated of insulation material and the segments 19a–19d imbedded or suitably molded on the upper surface thereof. Insulatingly spaced slip rings 155, 157, 159, 161 are concentrically arranged on the lower surface of gear 22 and conductive connection between segments 19a–19d and slip rings 155–161, respectively, can be effected in any suitable manner, as by threading pieces of wire through openings in the body of gear 22 and soldering the wires to the corresponding segments and slip rings.

Two sets of brushes 163, 165 are carried by top plate 12a, one set 163 on the upper surface of plate 12a and engaging slip rings 155–161. The other set of brushes 165 is mounted on the underside of plate 12a and engages slip rings 167, 169, 171, 173, which are insulatingly spaced in concentric array on the case 27 of the bearing indicator 12.

Respective brushes of set 163 are individually electrically connected to brushes of set 165 by suitable conductors insulated from plate 12a, as shown. Connection to individual rings 167–173 from external circuit arrangements can be effected by passing any conventional cable (not shown) through an opening 175 in the cover plate of case 27.

Pivotally supported on top plate 12a and disposed for motion relative to and above the commutator ring is the lever 25 having a pair of oppositely extending arms 27, 29, each of which arms is provided with a respective contact point 31, 33. The lever 25 is formed with a medial body portion 35 having a transverse rectangular opening 177 substantially larger than a rectangular cap 179 formed at the upper end of shaft 149 and into which opening the cap is adapted to be passed in balance-mounting the lever 25. As shown (Fig. 3), the cap 179 is formed with inwardly extending conical recesses 181, 183, in opposed sides thereof and providing bearing surfaces for screws 185, 187 carried by the body portion 35. The lever is balanced and pivoted by the screws 185, 187 so that contacts 31, 33 normally clear the segments by a very small distance, as seen in Fig. 4.

A pair of parallel supports 189, 191 are formed on the body portion 35, which support a transverse pin 193 on which a grooved wheel 195 is freely rotatable. The fine wire or cable 20 freely passes through the groove in wheel 195 normally without bearing against the walls thereof.

In operation, in the position shown in Fig. 2, when the top plate 12a of the bearing repeater 12 is rotated slightly by motor 18a, gear 22 is caused to roll on idler 23, which, in turn rolls around gear 21. As above described, the orientation of gear 22 is unchanged by such rotation. However, since lever 25 is angularly displaced at the rotation of plate gear 12a, lever 25 is tipped as a result of the torque exerted by cable 20 on the wall of the grooved wheel 195, and the contact at one of the segments, say that at 19b closes causing motor 17 (Figs. 1 and 1a) to rotate, as will be described hereinbelow.

As shown in Fig. 1a, the multiple contact assemblies 19 of each of the repeaters 12 are connected through a suitable amplifier arrangement 195 to a relay control circuit 197. The amplifier arrangement 195 can be any suitable combination of vacuum-tube amplifiers wherein the leads from individual segments of the segments 19a–19d are connected to respective control grids of corresponding tubes (not shown), thereby to initiate the flow of plate current upon the occurrence thereat of a positive voltage. The plate circuits of the respective tubes include electromagnetic relay coils A–L each of which actuates a respective set of three relay contacts $A_1$, $A_2$, $A_3$, . . . $L_1$, $L_2$, $L_3$. The contacts are shown, in symbols employed in conventional electrical engineering practice, as = signs for those contacts normally open and ≠ signs for those contacts normally closed.

Operation of the relays controls the motors 16 and 17 and consequently, the direction in which the position indicator 13 is caused to move. For example, if the bearing repeater at the left-hand side of table 11 is actuated so that the lever 25 thereof contacts segment 19d, relay B completes the circuit in lead S simultaneously opening the circuits $B_2$ and $B_3$ in lead S. Thus relay B has assumed control of motor 17, the north-south control motor, and drives that motor so as to move the position indicator 13 in a south direction until correct positioning of the indicator 13 restores the actuating wire 20 to proper alignment, whereupon the lever 25 is restored to balanced condition. At this point, contact with segment 19d is broken.

In the vent that motor 17 causes indicator 13 to overshoot its mark, misalignment of wire 20 causes the lever contact to be made at segment 19b energizing relay coil A. Energization of coil A causes actuation of contacts A₁, A₂ and A₃ thereby completing the circuit in lead N and breaking the circuit A₂ and A₃. Motor 17 now drives the position indicator 13 in the north direction until proper alignment of wire 20 restores the lever 25 to the balance position.

Two contacts will close simultaneously only when the bearing is nearly NE, NW, SE or SW; for any other bearing only one contact will close. For example, if bearing repeater 12 is lined up in the north-south direction, rotation will cause only one of contacts 19a or 19c to close causing motor 16 to rotate and if bearing repeater 12 is lined up in the east-west direction, rotation will cause only one of the contacts 19b or 19d to close causing motor 17 to rotate.

A small lamp 26 secured to the case of bearing repeater 12 but mounted axially with top plate 12a projects the marking of the center of bearing repeater 12 on the chart or map.

Inasmuch as bearing repeaters 12 are placed on table 11 to correspond to the location of known landmarks, and further inasmuch as the rotational position of each bearing repeater 12 is controlled by a pelorus aimed at the corresponding landmark, it is apparent that there is provided an automatic control to maintain position indicator 13 at the location of table 11 corresponding to the actual position of the ship with relation to the fixed landmarks.

The calibrations on card 13b make possible rapid plotting of courses and distances obtained from various special apparatus aboard vessels and the invention may be used for the making of hydrographic surveys, or the like, as well as for wartime uses such as the plotting of locations of submarines or mines, or the like.

Because of the central axis of scale 13b of indicator 13 is always at a known position relative to the fixed landmarks, any other object of which the range or distance and relative bearing from the ship is known can immediately be plotted on the chart by means of the relative bearing scale 13b and the range or distance rings 32, the scale of which is substantially identical with that of the chart. Distortion of the projected scale can be minimized by the employment of a suitable conventional optical projection system.

It is to be understood that various modifications and changes may be made in this invention without departing from the spirit or scope thereof as set forth in the appended claims.

The invention described herein may be manufactured and used by or for the Government of the United States of America for governmental purposes without the payment of any royalties thereon or therefor.

What is claimed is:

1. Apparatus for continuously and automatically indicating the position of a movable body with respect to fixed objects the positions of which are known, said apparatus comprising a position indicator, means for moving said position indicator to a desired position in a selected area, a plurality of bearing repeaters selectively positionable in said area to represent the positions of said fixed objects, means to rotate each of said bearing repeaters to represent the true bearing of the movable body from the corresponding fixed object, and means connected between said bearing repeaters and said position indicator to operate said means for moving the position indicator to the position in said area which represents the location of said movable body.

2. The apparatus as defined in claim 1 wherein said last-named means comprise flexible members adapted normally to be maintained in predetermined alignment in parallelism with the line of sight from said body to the corresponding object, said rotatable means being responsive to alteration of the instant relative orientation of said body and said objects to alter said predetermined alignment.

3. The apparatus as defined in claim 1 further comprising optical means for determining the bearings of said body relative said objects and including synchro data transmission elements coupled to said optical means, said repeaters comprising synchro motors coupled to said transmission elements.

4. Apparatus for continuously and automatically indicating the position of a movable body with respect to fixed objects the positions of which are known, said apparatus comprising a position indicator, positioning screws fixed at right angles to each other adapted to control the location of said position indicator, means connected to said screws and adapted to move said position indicator, a plurality of bearing repeaters selectively positionable to represent the positions of said fixed objects, means to rotate each of said bearing repeaters to represent the true bearing of the movable body from the corresponding fixed object, and means connected between said bearing repeaters and said position indicator to operate said means for moving the position indicator to the position in said area which represents the location of said movable body.

5. Apparatus for continuously and automatically indicating the position of a ship with respect to fixed objects the positions of which are known, said apparatus comprising a flat surface, a position indicator adapted to be moved thereover, positioning screws at right angles to each other adapted to control the motion of the position indicator, electric motors energizable to rotate said screws, a plurality of bearing repeaters movably positioned on that flat surface, means for mounting a chart in a predetermined position with respect to said position indicator and bearing repeaters, light means in the position indicator adapted to project the ship's position on the chart and further means in said bearing repeaters adapted to project onto the chart the locations of the centers of the bearing repeaters to determine the positioning of the bearing repeaters at the locations representing fixed objects, means connected to each of the bearing repeaters to rotate the bearing repeater to represent the true bearing of said ship from the corresponding fixed object, and means connected to the bearing repeaters and the position indicator to control said electric motors adapted to drive said positioning screws to maintain the position indicator at the intersection of the lines of bearing of the bearing repeaters.

6. Apparatus for accurately and rapidly plotting objects having known distances and relative bearings from a movable body, said apparatus comprising a table top, a plurality of bearing repeaters positioned on said table top, a heading and position indicator, a relative bearing and distance indicating member on the position and heading indicator adapted to be rotated to the true heading of said movable body and having marked thereon a scale of distance and of relative bearings with respect to the movable body, lights in the bearing repeaters and heading and position indicator to project the representations of the centers of the bearing repeaters on a chart mounted above the table top to determine the positioning of said bearing repeaters at the locations of known fixed objects and to project the presentations of said scales of relative bearings and distances on said chart, means to rotate each of said bearing repeaters to represent the true bearing of said movable body from the corresponding fixed objects, positioning screws at right angles to each other and adapted to control the location of the position indicator, electric motors operating the positioning screws, and means connected to said bearing repeaters and said heading and position indicator to control the electric motors to move the heading and position indicator over the table top to the position representing the location of said movable body as determined by the intersection of the lines of bearing repeaters.

7. In a position-indicating apparatus for a mobile craft, the combination comprising means simulating the region of navigation of the craft, means manually positionable on said region-simulating means and corresponding to preselected fixed landmarks in the region, electric switch means carried by said positionable means and cooperable with rotatable means on said positionable means to detect changes in relative orientation of the craft and respective landmarks, a position indicator mounted for movement over said region-simulating means to designate the instant position of the craft relative to the landmarks, motive means in circuit with said switch means and coupled to said indicator, and flexible connections between said indicator and said positionable means and coupled to said switch means thereby to be responsive to changes in orientation of the craft relative to said landmarks to actuate said switch means, whereby said motive means are energized to position said indicator in accordance with the changed orientation of the craft.

8. The combination as in claim 7, wherein said positionable means comprise three position repeaters, each said repeater having a rotatable plate member adapted to be driven in accordance with changes in orientation of the craft, and gear mechanism connecting said plate member and said switch means.

9. The combination as in claim 7, wherein said switch means comprises a multi-segment commutator and a lever mounted for rotary movement relative to and spaced from said commutator segments, said lever being responsive to actuation of said flexible connections to contact a predetermined one of the segments of said commutator.

10. The combination as in claim 7, wherein said position indicator comprises a pair of relatively rotatable circular scales and a plurality of concentric range markings on one of said circular scales for indicating ranges of a selected object from the craft.

11. In apparatus for indicating the position of a movable body with respect to remote objects the positions of which are known, the combination comprising a position indicator, positioning screws fixed at right angles to each other and adapted to control the location of said position indicator, motive means connected to said screws, a plurality of bearing repeaters selectively positionable to represent the positions of the objects, means to energize each of said bearing repeaters in accordance with variations in location of the body relative to the objects, whereby said repeaters instantly represent the true bearing of the movable body from the corresponding fixed objects, and means connected between said bearing repeaters and said position indicator to operate said motive means to move the position indicator to the position in said area that represents the instant location of the body.

References Cited in the file of this patent

UNITED STATES PATENTS

| | | |
|---|---|---|
| 568,755 | Greenough | Oct. 6, 1896 |
| 1,437,400 | Conners | Dec. 5, 1922 |
| 1,494,770 | Conners | May 20, 1924 |
| 1,843,978 | Hensey | Feb. 9, 1932 |
| 1,853,087 | Shippy | Apr. 12, 1932 |
| 1,964,317 | Fairchild | June 26, 1934 |
| 1,965,098 | Eaton | July 3, 1934 |
| 2,238,190 | Sawtelle | Apr. 15, 1941 |
| 2,256,181 | Tryner | Sept. 16, 1941 |
| 2,277,149 | Schaper et al. | Mar. 24, 1942 |
| 2,361,839 | Hartley | Oct. 31, 1944 |
| 2,361,956 | Moseley | Nov. 7, 1944 |
| 2,366,772 | Ebeling | Jan. 9, 1945 |
| 2,403,633 | Browning | July 9, 1946 |
| 2,422,025 | Luck | June 10, 1947 |
| 2,423,513 | Meyer | July 8, 1947 |
| 2,446,433 | Putnam | Aug. 3, 1948 |
| 2,449,342 | Tardif | Sept. 14, 1948 |
| 2,455,164 | Ebeling | Nov. 30, 1948 |
| 2,482,105 | Duggar | Sept. 20, 1949 |
| 2,485,663 | Rusch et al. | Oct. 25, 1949 |
| 2,496,674 | Ornberg | Feb. 7, 1950 |
| 2,541,277 | Ornberg | Feb. 13, 1951 |